United States Patent [19]

Curtis et al.

[11] 3,873,664
[45] Mar. 25, 1975

[54] HEAT TREATMENT OF POLYESTER ROLLS

[75] Inventors: James R. Curtis, Greenville, S.C.; Thomas A. Palmer, Notasulga, Ala.; Billy J. Wilson, Greenville, S.C.

[73] Assignee: Celanese Corporation, New York, N.Y.

[22] Filed: Aug. 29, 1973

[21] Appl. No.: 392,843

[52] U.S. Cl.............. 264/146, 264/234, 264/235, 264/236, 264/289, 264/346
[51] Int. Cl............................................. B28b 11/16
[58] Field of Search ........... 264/146, 289, 234, 235, 264/236, 346

[56] References Cited
UNITED STATES PATENTS 3,061,886  11/1962  Seager et al. ...................... 264/346
3,761,553  9/1973  Richardson ........................ 264/40

Primary Examiner—Melvyn I. Marquis
Attorney, Agent, or Firm—Thomas J. Morgan; Linn I. Grim; Marvin Bressler

[57] ABSTRACT

A process for improving the quality of a thermoplastic, preferably a polyethylene terephthalate film. Slit rolls of polyethylene terephthalate film are exposed to an environment maintained at a temperature in the range of between about 15°C. and 35°C. above the temperature at which the rolls were wound for a period of at least 24 hours. This process significantly decreases the formation of surface defects that otherwise form on the surface of the film in the rolls not so treated.

5 Claims, No Drawings

HEAT TREATMENT OF POLYESTER ROLLS

BACKGROUND OF THE INVENTION

1. Field of the Invention

The instant invention is directed to a process for producing improved polyethylene terephthalate film. More particularly, the instant invention is directed to a process for improving the surface quality characteristics of polyethylene terephthalate film. Still more particularly, the instant invention is directed to a process for improving the surface quality characteristics of polyethylene terephthalate film by heating the polyethylene terephthalate rolls after the film is formed into said rolls.

2. Background of the Prior Art

The outstanding physical properties of polyethylene terephthalate film has resulted in the widespread use of this film in many commercial applications. One of these major applications is the use of polyethylene terephthalate film as a substrate for magnetic coatings in the production of audio, video and computer tapes. Other major uses for polyester film include the use of this film as a substrate for the deposition of metal coatings by vacuum techniques (metallized film). These applications, as well as many others not mentioned here, require that the surface of the film be unblemished. That is, the surface must be smooth without any lines, indentations or the like.

A better appreciation of this problem can be gained by a brief review of the process by which polyethylene terephthalate films are generally produced. Polyethylene terephthalate film is made by first extruding molten polyethylene terephthalate through a slotted die to form a cast melt to polyethylene terephthalate. The melt is quenched on a casting drum to produce a cast sheet. The cast sheet is biaxially stretched in the longitudinal and transverse directions to form a film. The amount of stretching imparted to the film in these two perpendicular directions is a function of the desired tensile properties and dimensional stability that the manufacturer wishes to impart to the film. The biaxially drawn film is thereafter heat set at elevated temperatures to crystallize the film and thus impart to the film the desired thermal stability. The film is immediately cooled after heat setting and, after trimming the edges, are wound on to a mill or master roll. The master roll is usually slit into standard width films. These films are rolled to form "slit rolls." In most cases, the slit rolls are stored and/or shipped prior to usage. It is on these master rolls and slit rolls that surface defects originate. These surface defects result from a complex combination of effects, such as internal compressive pressure, tensile forces, temperature expansion phenomenon, transverse direction film gauge variation and the like.

Although this problem has been identified in the literature of the prior art, no totally satisfactory solution has been found to overcome surface defect formation on master and slit rolls. Probably the closest related reference dealing with a somewhat similar phenomenon is U.S. Pat. No. 3,061,886. This reference teaches the relaxation of a roll of wide coated tape by heating the roll at a temperature of between 90°F. and 140°F. for at least 20 hours followed by winding into small rolls under tension at a temperature of about 90°F. to 105°F.

Although the above-described patent is a significant advance in the art, it does not solve the problems associated with master and slit rolls of uncoated polyethylene terephthalate film. For one thing, it is directed solely to coated films. As those skilled in the art are aware, the problems associated with coated films are distinguished from the problems to which the process of the instant invention is directed. Indeed, before polyethylene terephthalate film may be coated there can be no surface deformations that are characteristic of much of the uncoated polyethylene terephthalate film of the prior art.

Although the reference results in an improved product, it requires the addition of a new processing step. That is, the relaxed coated film of this prior art process must be wound under tension at a predetermined temperature. This is necessary in order to prevent deformation of the wound coated tape during storage, shipment and use. This re-winding step, at a prescribed elevated temperature, adds significant expense to the overall process.

In summary, the method employed in the reference for prevention of deformation of coated tape overcomes the problems associated with the different coefficients of thermal expansion of the coating and the base film. Since this problem does not exist with an uncoated film, the complex process employed for relaxing coated tape is not applicable to the problems associated with uncoated polyethylene terephthalate film.

SUMMARY OF THE INVENTION

The instant invention is directed to a process for prevention of surface deformations, defects and the like which arise in the production of polyethylene terephthalate film. Films formed in accordance with this process produce acceptable coated tapes for use in audio, video and computer applications as well as other uses that require defect-free polyethylene terephthalate film surfaces.

A further feature of the process of the instant invention is its simplicity over the methods employed in the prior art. A one step procedure is all that is required in the treatment of these film rolls. No special apparatus or additional film process is necessary other than the one step process of this invention.

In accordance with the instant invention a process is provided for manufacturing a polyethylene terephthalate film having defect-free surfaces. In the process where polyethylene terephthalate is melted and extruded through a die onto a cooled casting roll to form a cast sheet, the sheet drawn in both longitudinal and transverse directions to form a biaxially oriented film which is subsequently heat set, the heat set film having a maximum gauge variation of not more than 7 percent wound into a master roll, the master roll film wound into one or more slit rolls, the improvement comprising exposing said slit rolls to an environment maintained at a temperature in the range of between 15°C. and 35°C. above the temperature at which the film is wound into said slit rolls for a period of at least 24 hours.

DETAILED DESCRIPTION

Polyethylene terephthalate film and other thermoplastic polymeric films which are formed by a procedure analagous to the procedure by which polyethylene terephthalate film is formed, is subject to the formation of surface deformations subsequent to the rolling of the film onto slit rolls.

Polyethylene terephthalate film is traditionally formed by initially melting polyethylene terephthalate and extruding the melt through a die onto a cooled casting roll. The cast sheet so formed is drawn in both longitudinal and transverse directions to form a baixially oriented film. The biaxially oriented film is thereafter heat set. The heat set film, having a gauge variation of not more than 7 percent is rolled into a master roll. The master roll is then slit into commercial widths. The slit film is wound into one or more slit rolls. The slitting and winding occur in a single operation.

Although it has not been conclusively proven, it is theorized that the basic cause for the development of surface deformations in polyethylene terephthalate and similarly formed films is the combination of gauge variation, that is uneven thickness of the film across the width of the film, and complex effects set up by winding and storage of the film in the form of slit rolls.

The solution of the problem of surface deformation has previously been considered from the point of view of improvement in the degree of gauge variation. For example, copending u.S. Pat. application Ser. No. 157,216, filed on June 28, 1971, and now U.S. Pat. No. 3,761,553 issued to Richardson on Sept. 25, 1973, is directed to a method for producing a biaxially drawn thermoplastic film of substantially uniform thickness throughout its width by controlling the amount of heat at the die lip opening. This, as well as many other advances in the prior art have significantly improved gauge uniformity of polyethylene terephthalate and other similarly formed thermoplastic films. Thus, polyethylene terephthalate films having a maximum transverse direction gauge variation of 7 percent have been developed. More preferably, the transverse direction gauge variation of the polyethylene terephthalate film of this invention of between about 2 and 4 percent have been attained. The transverse direction gauge variation is defined as the maximum variation from the nominal width. For example, a 7 percent variation in a 1 mil thick film indicates that the maximum thickness does not exceed 1.07 mils, and minimum thickness is not less than 0.93 mil.

In a still more preferred embodiment of this invention a further transverse direction gauge limitation is imposed of films formed in accordance with the process of this invention. That is, the maximum abrupt change in gauge is 1.5 percent per inch in the transverse direction.

These developments have resulted in a marked improvement in shrinkage of polyethylene terephthalate film due to the formation of surface deformation. However, unless there is absolutely no transverse direction gauge variation the problem of surface deformations cannot be completely solved by transverse direction gauge improvements only. Thus, many recent developments have centered on means of processing state of the art film, that is, film having good but not perfect transverse direction gauge variation, to eliminate surface deformations.

Those skilled in the art appreciate that even the improved polyethylene terephthalate film of the present time, having a transverse direction gauge variation of not more than 7 percent and preferably a gauge variation of 2 to 4 percent, are subject to surface deformation due to the combined effects of pressure, stress, and temperature when in a rolled condition. A discussion of these effects would be long and complex. Suffice it to say, two types of surface defects result from long term storage of thermoplastic films, such as polyethylene terephthalate film, which are extruded as a melt and are thus susceptible to gauge variations. The first of these defects is summarized by the term "stretch lanes." Stretch lanes represent a permanent surface defect which renders normally transparent polyethylene terephthalate film opaque. Thus, stretch lanes appear as white opaque lines which extend relatively long distances in the longitudinal direction of the film. If a transverse direction trace of the gauge profile, from one edge to the other along the width of the film, is made, it is found that the high points of the film, that is, the points along the film width having the greatest amplitude, correspond to the positions where the stretched lanes appear. It is postulated that stretch lanes are produced, when the film is rolled up, due to tension, by the "bumps" that are produced by these high points resulting in stretching of the film which are manifest by the appearance of stretch lanes. Fortunately, it has been found that films having a gauge variation of not more than 7 percent, because of the absence of marked high points, do not produce stretch lanes. As will be discussed below, the ability to control stretch lanes by good gauge control is critical to the process of the instant invention.

The second type of surface defect or deformation is known as MD lines. This defect is alternately known as "honeycomb" and is characterized by surface imperfections which do not effect the transparency of the film at the points of imperfection. As suggested by the names used for describing this surface defect, the surface imperfection appears as line or honeycomb pattern indentations. Although the exact cause for this defect is not known with certainty, it is postulated that transverse direction gauge variation in combination with pressure and temperature effects that occur while the film is in a roll causes this surface defect. It has been discovered that MD lines and/or honeycombs occur generally in the longitudinal directions and at a point along the width corresponding to low points in the transverse direction gauge profile. That is, these surface defects occur at positions along the width of the film corresponding to low amplitude points between surrounding high amplitude gauge points. Indeed, it has been noticed, in many cases, that the greater the amplitude of the peak surrounding a low point in the film, the more significant is the surface defect. Unlike stretch lanes, the surface defect denoted as MD lines or honeycomb is not eliminated by careful control over gauge variation. Even films having a gauge variation not in excess of 7 percent exhibit MD lines and honeycomb after storage on a roll.

It has now been found that the problems of MD lines and honeycomb can be eliminated by the process of the instant invention. It has been found that heating polyethylene terephthalate film immediately after the film is rolled into slit rolls and after the slit rolls have reached room temperature eliminates the problem presented by MD lines and honeycomb. In accordance with this process the heat treatment comprises exposure to a temperature in the range of between about 15° and 35°C. in excess of the temperature at which the film was wound into slit rolls. The heat treatment is maintained for at least 24 hours. More preferably, the heat treatment comprises exposing the slit rolls to a temperature 20°C. to 25°C. in excess of the slit winding temperature. In a further preferred embodiment the duration of time to which the slit rolls are exposed to heat treatment ranges between about 48 and 72 hours.

Although the process of this invention results in the elimination of MD lines or honeycombs, heat treatment at temperatures in excess of those described above may result in the formation of stretch lanes, even though this form of surface deformation did not appear in the absence of a heat treatment step. This phenomenon is postulated to be caused by the expansion of the film, especially at the high amplitude points, along transverse direction, which further stretches the film, thus increasing the gauge variation to result in the formation of stretch lanes. It is emphasized that this adverse affect does not occur if the gauge variation of the film is not more than 7 percent and the film is heated to no more than 35°c. above the temperature at which the film is rolled into slit rolls.

The following example is given to illustrate the process of the instant invention. Since this example is furnished for illustrative purposes only, it should not, in any way, be deemed to limit the scope of this invention.

EXAMPLE

Polyethylene terephthalate film was prepared by melting polyethylene terephthalate and extruding the melt through a slot die. The melt was quenched on a cooled casting roll to form a cast sheet. The cast sheet was stretched in the longitudinal and transverse directions to form a biaxially oriented film. The film was thereafter heat set and wound onto a master roll. The master roll was slit and wound into slit rolls. The temperature of the film during slitting and winding was 25°C.

Two hundred nineteen slit rolls, having a gauge thickness of 0.88 mil were prepared by the above-described method. All of the rolls had a transverse direction gauge variation of approximately 4 percent. None of the rolls had any abrupt transverse direction gauge variations in excess of 1½ percent per inch.

Of the 219 slit rolls produced, 199 of them were stored without any further treatment. The remaining 20 rolls were treated in accordance with the process of this invention. That is, the 20 rolls were placed in an oven maintained at a temperature of 45°C. (20°C. above the film temperature during the slit roll formation). The 20 rolls were kept in a 45°C. oven for 72 hours.

Of the 199 untreated slit rolls, 108 rolls were rejected due to the formation of MD lines and honeycomb on the film. This represented a failure rate of 54 percent. Of the 20 rolls treated in accordance with this invention 17 did not result in the appearance of MD lines or honeycomb. Three rolls exhibited MD lines or honeycomb representing a failure rate of 15 percent. Thus, the acceptance rate for slit rolls increased from 45 percent to 85 percent by the employment of the process of this invention.

It should be noted that on none of the 219 rolls, did stretch lanes develop. This indicates that stretch lanes do not generally develop on film having a maximum transverse direction gauge variation of not more than 7 percent and more preferably 2 to 4 percent. It, moreover, indicates that stretch lanes will not develop in polyethylene terephthalate film if the film has a transverse direction gauge variation within the range limitation of this invention and is treated in accordance with the process of this invention.

The above preferred embodiments and example are given to illustrate the scope and spirit of the instant invention.

Other preferred embodiments and examples, within the scope and spirit of the instant invention are within the contemplation of this invention. The invention, therefore, should be limited only by the appended claims.

What is claimed is:

1. In a process for producing polyethylene terephthalate film in which polyethylene terephthalate is melted and extruded through a die onto a cooled casting roll to form a cast sheet, the cast sheet drawn in both longitudinal and transverse directions to form a biaxially oriented film which is subsequently heat set, said heat set film wound into a master roll, said film on said master roll having a transverse direction gauge variation of not more than 7 percent, the film on said master roll then slit and wound on one or more slit rolls, the improvement which comprises exposing said slit rolls to an environment maintained at a temperature in the range of between about 15°C. and 35°C. above the temperature at which the film was slit and wound into said slit rolls for at least 24 hours.

2. An improved process in accordance with claim 1 wherein said slit rolls are exposed to said elevated temperature environment for a period of time in the range of between about 48 and 72 hours.

3. An improved process in accordance with claim 1 wherein said slit rolls are exposed to an environment maintained at a temperature in the range of between about 20°C. and 25°C. above the temperature at which the film was slit and wound into said slit rolls.

4. An improved process in accordance with claim 1 wherein said temperature at which said film is slit and wound is in the range of about 25°C.

5. An improved process in accordance with claim 4 wherein said slit rolls are exposed to said elevated temperature environment for a period of time in the range of between about 48 and 72 hours.

* * * * *